US009420756B2

(12) United States Patent
Carroll et al.

(10) Patent No.: US 9,420,756 B2
(45) Date of Patent: Aug. 23, 2016

(54) MODULAR MANIPULATION DEVICE

(75) Inventors: Aaron D. Carroll, Maryville, TN (US); Kristopher C. Hall, Maryville, TN (US); Benjamin D. Nibali, Maryville, TN (US)

(73) Assignee: DAIRY CHEQ, INC., Waterloo, Ontario (CA)

( * ) Notice: Subject to any disclaimer, the term of this patent is extended or adjusted under 35 U.S.C. 154(b) by 351 days.

(21) Appl. No.: 13/701,818

(22) PCT Filed: Jun. 3, 2011

(86) PCT No.: PCT/US2011/039185
§ 371 (c)(1),
(2), (4) Date: Jan. 15, 2013

(87) PCT Pub. No.: WO2011/153510
PCT Pub. Date: Dec. 8, 2011

(65) Prior Publication Data
US 2013/0112145 A1    May 9, 2013

Related U.S. Application Data

(63) Continuation-in-part of application No. PCT/US2011/036524, filed on May 13, 2011.

(60) Provisional application No. 61/351,687, filed on Jun. 4, 2010.

(51) Int. Cl.
*A01J 3/00* (2006.01)
*A01J 5/017* (2006.01)

(52) U.S. Cl.
CPC . *A01J 3/00* (2013.01); *A01J 5/0175* (2013.01)

(58) Field of Classification Search
CPC ..... A01K 1/12–1/126; A01J 1/00; A01J 9/00; A01J 5/0175; A01J 5/00; A01J 5/017; A01J 5/007; A01J 3/00
USPC ......... 119/14.01, 14.02, 14.03, 14.08, 14.14, 119/14.15, 14.18
See application file for complete search history.

(56) References Cited

U.S. PATENT DOCUMENTS

| | | | |
|---|---|---|---|
| 4,590,410 | A | 5/1986 | Jonsson |
| 4,726,322 | A | 2/1988 | Torsius |

(Continued)

FOREIGN PATENT DOCUMENTS

| | | |
|---|---|---|
| JP | 47-025858 | 10/1972 |
| JP | 60-009677 | 1/1985 |

(Continued)

OTHER PUBLICATIONS

International Search Report (ISA/US) for International Application No. PCT/US2011/039185, mailed Oct. 20, 2011, 1 page.

(Continued)

*Primary Examiner* — Kristen C Hayes
*Assistant Examiner* — Ebony Evans
(74) *Attorney, Agent, or Firm* — Foley & Lardner LLP; Antoinette F. Konski

(57) ABSTRACT

The present invention relates to modular apparatuses for manipulation of animals and to methods of manipulating animals with the modular apparatuses of the invention. A modular apparatus according to one aspect of the present invention comprises: (a) a main support fixed to a stationary point, (b) a number of arms, each of said arms comprising a proximal end and a distal end, each changeable arm having a longitudinal axis extending between the proximal and distal ends, wherein said proximal end is pivotally mounted to the main support for rotation thereof about a first pivot axis substantially orthogonal to the longitudinal axis, and (c) one or more end of arm changeable tools, wherein said one or more end of arm changeable tools are pivotally coupled to the distal ends of each arm for rotation thereof about a second pivot axis, wherein the second pivot axis is substantially parallel to the first pivot axis.

20 Claims, 6 Drawing Sheets

(56) References Cited

U.S. PATENT DOCUMENTS

| | | | |
|---|---|---|---|
| 4,748,936 A * | 6/1988 | Hogen Esch | 119/14.02 |
| 4,867,103 A | 9/1989 | Montalescot et al. | |
| 4,872,147 A | 10/1989 | Hilhorst | |
| 5,020,477 A | 6/1991 | Dessing et al. | |
| 5,042,428 A | 8/1991 | Van Der Lely et al. | |
| 5,069,160 A | 12/1991 | Street et al. | |
| 5,383,423 A * | 1/1995 | van der Lely | 119/673 |
| 5,606,932 A | 3/1997 | Van Der Lely | |
| 5,784,994 A * | 7/1998 | van der Lely | 119/14.08 |
| 5,791,284 A | 8/1998 | Van Der Lely | |
| 5,934,220 A | 8/1999 | Hall et al. | |
| 6,118,118 A | 9/2000 | Van Der Lely et al. | |
| 6,148,766 A * | 11/2000 | van der Lely | 119/14.08 |
| 6,213,051 B1 | 4/2001 | Fransen | |
| 6,331,181 B1 * | 12/2001 | Tierney et al. | 606/130 |
| 6,363,883 B1 | 4/2002 | Birk | |
| 6,647,919 B2 | 11/2003 | Vijverberg | |
| 6,729,262 B2 | 5/2004 | Ealy et al. | |
| 6,948,449 B2 * | 9/2005 | Van der Lingen et al. | 119/14.13 |
| 7,202,467 B2 | 4/2007 | Koehler et al. | |
| 7,952,511 B1 | 5/2011 | Geer | |
| 8,373,109 B2 | 2/2013 | Boersma et al. | |
| 8,807,080 B2 | 8/2014 | Van Den Berg | |
| 9,119,372 B2 | 9/2015 | Carroll et al. | |
| 2003/0090408 A1 | 5/2003 | Matsuura | |
| 2004/0065264 A1 | 4/2004 | Ealy et al. | |
| 2009/0192522 A1 * | 7/2009 | Blumenkranz | 606/130 |
| 2010/0186675 A1 | 7/2010 | Van Den Berg | |
| 2011/0023785 A1 | 2/2011 | Boersma | |
| 2014/0318459 A1 | 10/2014 | Van Den Berg | |

FOREIGN PATENT DOCUMENTS

| | | |
|---|---|---|
| JP | 01-321182 | 12/1989 |
| JP | 06-070655 | 3/1994 |
| JP | 06-226661 | 8/1994 |
| JP | 2000-254887 | 9/2000 |
| JP | 2002-512720 | 4/2002 |
| JP | 2002-514057 | 5/2002 |
| JP | 2006-110641 | 4/2006 |
| JP | 2010-502181 | 1/2010 |
| NZ | 243228 | 6/1995 |
| WO | WO-2008/030086 | 3/2008 |
| WO | WO 2009/120129 A1 | 10/2009 |

OTHER PUBLICATIONS

International Search Report (ISA/US) for International Application No. PCT/US2011/036524, mailed Aug. 24, 2011.

Non-Final Office Action in U.S. Appl. No. 13/697,778, dated Jan. 15, 2015.

Notice of Allowance in U.S. Appl. No. 13/697,778, dated Apr. 29, 2015.

* cited by examiner

MODULAR MANIPULATION DEVICE

CROSS-REFERENCE TO RELATED APPLICATIONS

This application is a national stage entry under 35 U.S.C. §371 of International Application No. PCT/US2011/039185, filed Jun. 3, 2011, which in turn claims the benefit under 35 U.S.C. §119(e) of U.S. Provisional Application No. 61/351,687, filed Jun. 4, 2010, and claims priority to PCT Application No. PCT/US2011/036524, filed May 13, 2011, the contents of each of which are hereby incorporated by reference in their entirety into the present disclosure.

FIELD OF THE INVENTION

The present invention relates to devices and methods for the manipulation of animals.

BACKGROUND OF THE INVENTION

Automatic or semi-automatic systems for milking animals, such as a cow, are known in the art. An important aspect of these systems is to position the milking system under the animal.

The automatic and semi-automatic devices of the prior art are bulky, non-modular and do not offer a rotation for each direction motion. For example, U.S. Pat. No. 7,146,928 (US '928) discloses a method and apparatus for automated milking of dairy cattle. The apparatus of US '928 consists of one main support, one main positioning arm and one milking platform which carries four seeker arms which serve to locate the teats of the dairy cow. The main positioning arm of US '928 may only rotate around the main support arm. No other rotational movement is provided by or is possible with the apparatus of US '928. In addition, the apparatus of US '928 is non-modular in that it does not include more than one functional unit, changeable arm, or section as it provides for only one main positioning arm carrying one milking platform. For servicing, the entire milking device must be replaced.

It would be advantageous to provide for a device and method for attaching a milking unit to an animal that overcome the disadvantages of the prior art.

SUMMARY OF THE INVENTION

The present invention provides devices and methods for automatic or semi-automatic manipulation of the teats of an animal. The devices, in some embodiments, are modular such that each component can be services, cleaned, or replaced without affecting other components of the device. The modularity of device also allows one single device to manipulate animals having different number of teats, without the need to have different devices for different animals. Moreover, the devices of the present invention, in some embodiments, can automatically detect locations and even numbers of the teats on the fly, without the need of any prior identification of the animals.

Accordingly, in one embodiment, provided is a modular apparatus used to manipulate teats of an animal standing on a floor, comprising: a main support fixed to a stationary point; a number of arms having a first end detachably coupled to the main support for rotational movement of the arms as a group or independently about a first horizontal axis; and one or more changeable tools detachably coupled to a second end of each of the number of arms for rotational movement of the one or more changeable tools as a group or independently about a second axis, said second axis being orthogonal to a third axis extending from the first end to the second end of each changeable arm, wherein rotational movement of the number of arms about the first horizontal axis and rotational movement of the one or more changeable tools about the second axis provide movement to the one or more changeable tools as a group or independently in a X and a Z directions to manipulate the teats.

In one aspect, each of said number of arms is configured to rotate about the third axis extending from the first end to the second end so as to provide rotational movement to the one or more changeable tools as a group or independently in a Y and the Z directions.

In another aspect, each of said number of arms is configured to telescope along the third axis extending from the first end to the second end of each arm so as to extend a reach of the one or more changeable tools as a group or independently in the X and the Z directions.

In yet another aspect, said number of arms are detachably coupled to a carriage mounted on the main support, said carriage being configured for moving the number of arms as a group in the X direction so as to extend a reach of the one or more changeable tools as a group in the X direction.

Still, in one aspect, said modular apparatus further comprises a controller, said controller being in communication with the one or more changeable tools, the main support and the number of arms, said controller for controlling the movement of the number of arms, the movement of the one or more changeable tools and the changeable tools to manipulate the teats of the animal with the one or more changeable tools.

In another aspect, said modular apparatus further comprises a controller having input means for receiving input from said input means, for computing an output to control movement of said number of arms relative to the animal, and for computing an output to control movement of said one or more changeable tools, and for computing an output to control operation of said one or more changeable tools to perform the manipulation of the teats.

In some aspects, said one or more changeable tools are selected from teat cups adapted for milking the teats, detection devices for generating signals useful for determining a position of the teats, fluid applying device, or any combination thereof.

In still some aspects, said one or more changeable tools include a teat cup connected to a milking line and a detection device, the device being capable of generating signals useful for determining the position of one teat of the animal, wherein each of said number of arms is capable of attaching the teat cup independently to one teat based on the signals generated by the detection device.

In another aspect, said number of arms are capable of moving the one or more changeable tools independently to a position under an udder of the animal relative to the number of teats of the animal.

The detection device, in some aspects, comprises an array of sensors, each sensor in the array including a transmitter means capable of substantially transmitting a transmission beam, and a receiver means capable of establishing a field of detection, said transmitter means and said receiver means being arranged within the array such that a detection zone is generated at the intersection between the transmission beam and the field of detection, said receiver means being capable of receiving a reflected beam from the teat from said transmission beam and reflected by the teat within the detection zone, and said receiver means being capable of generating a signal in response to the reflected beam from the teat within the detection zone, wherein the position of the teat is determined when all or substantially all of the receivers in the array generate the signal substantially simultaneously in response to the teat within their respective detection zones.

In one aspect, the transmission beam is a visible light, infrared or laser beam.

In another aspect, the receiving means is a light receiving photoelectric device.

In yet another aspect, said transmission beam is an ultrasound beam and said receiving means is an ultrasound receiving device.

In some aspects, the number of arms pivotally mounted to the main support is between one and the number of teats of the animal.

Also provided, in one embodiment, is a method of manipulating an animal standing on a floor, said animal having a number of teats, characterized in that said method comprises:
(a) pivotally mounting a number of arms to a main support for rotational movement thereof about a first pivot axis, wherein said number of arms is between one and the number of teats,
(b) pivotally coupling one or more changeable tools to the number of arms for rotational movement thereof about a second pivot axis, and (c) moving the number of arms to place the one or more changeable tools in a position suitable to manipulate the number of teats of the animal.

BRIEF DESCRIPTION OF THE DRAWINGS

The invention will be better understood and objects of the invention will become apparent when consideration is given to the following detailed description thereof. Such description makes reference to the annexed drawings wherein.

Figure 1:
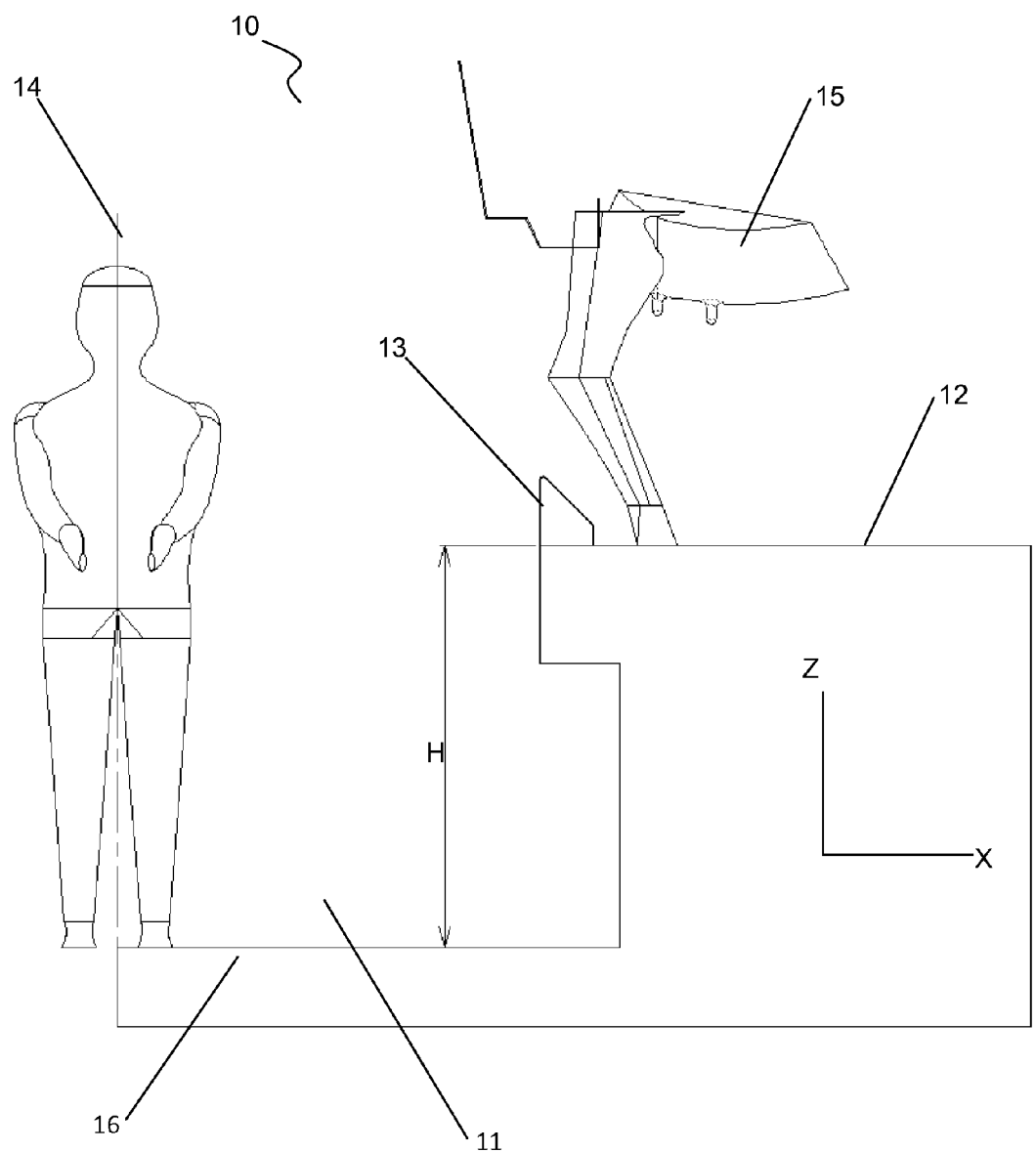
FIG. 1 illustrates a side view of a milking parlour (parallel arrangement).

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

Unless defined otherwise, all technical and scientific terms used herein have the same meaning as commonly understood by one of ordinary skill in the art to which this invention belongs. Also, unless indicated otherwise, except within the claims, the use of "or" includes "and" and vice-versa. Non-limiting terms are not to be construed as limiting unless expressly stated or the context clearly indicates otherwise (for example "including", "having" and "comprising" typically indicate "including without limitation"). Singular forms including in the claims such as "a", "an" and "the" include the plural reference unless expressly stated otherwise.

The invention will be explained in details by referring to the figures.

The present invention provides for devices and methods which may provide automatic or semi-automatic manipulation of the teats of an animal. In this document, the term "manipulation" is used in a broad sense to include applications that treat or operate on an animal. For example, the term "manipulation" includes milking, washing, pre-dipping, post-dipping, desinfecting, or other procedures which may apply to animal teats. In one embodiment of the present invention, the device of the present invention may be capable of positioning itself under an animal, locate the teats of the animal, wash the teats of the animal, attach teat cups to the teats of the animal, milk the animal, desinfect the teats of the animal and return to a home position with minimal human intervention.

The devices and methods of the present invention may be used in a milking parlour for dairy animals, including cows, goats and buffalo. The following discussion and examples concentrate on the application of the present invention in a milking scenario for dairy animals, however a person skilled in the art would comprehend these and other alternative implementations of the present invention as a natural extension of the present invention.

The terms "lateral", "longitudinal" and "vertical" may be used to describe movement relative to the animal which may be manipulated or relative to the platform of the stall in which the animal stands. The term "vertical" may describe substantial height (up/down) movement relative to the floor of the stall or relative to the animal's udder. The term "longitudinal" may describe movement substantially between the main support of the modular apparatus described herein below and the animal to be manipulated. The term "lateral" may describe movement substantially orthogonal to the longitudinal movement. A coordinate system may then be defined with "Z" being a vertical axis, "X" being a longitudinal axis, and "Y" being the lateral axis. For example in the case of a milking parlour having a parallel arrangement for rear milking (see FIG. 1), movement along the X axis may describe movement between the modular apparatus and the animal and substantially along the spine of the animal (i.e. from tail to head), while movement along the Y axis may describe movement substantially orthogonal to the spine of the animal (i.e. form one side of the animal to the other). In the case of a milking parlour employing lateral milking, movement along the X axis may describe movement between the modular apparatus and the animal and substantially across the spine of the animal, while movement along the Y axis may describe movement substantially along the spine of the animal.

FIG. 1 illustrates a typical milking parlour 10 for cows employing a parallel arrangement (rear milking) with a cow 15 in position for milking. A typical parallel milking parlour 10 may include a pit 11 and an animal platform or floor 12 above the pit 11. The platform 12 may be divided into stalls, wherein each stall may accommodate one animal in position for milking. The animal platform 12 may be provided with a curb 13. The pit 11 should be wide enough to allow an operator to walk along the centre line 14 of the parlour 10 and to allow for the positioning or fixing of the modular apparatus of the present invention to a stationary point in the parlour 10, such as the floor 16 of pit 11. For example, the pit 11 may be about 58 inches (about 147.3 cm) wide. The distance from the floor 16 of the pit 11 to the platform 12 is represented by H. H may be about 41 inches (about 104.1 cm). It should be understood that the distances are relative and may be quite variable from parlour to parlour. FIG. 1 illustrates vertical axis Z, and longitudinal axis X substantially along the spine of animal 15. Although the following description is based on a milking parlour employing a lateral arrangement, it should be understood that the modular apparatus of the present invention may be used with other milking parlour arrangements known in the art, including herringbone, tandem and rotary arrangements.

Figure 2:
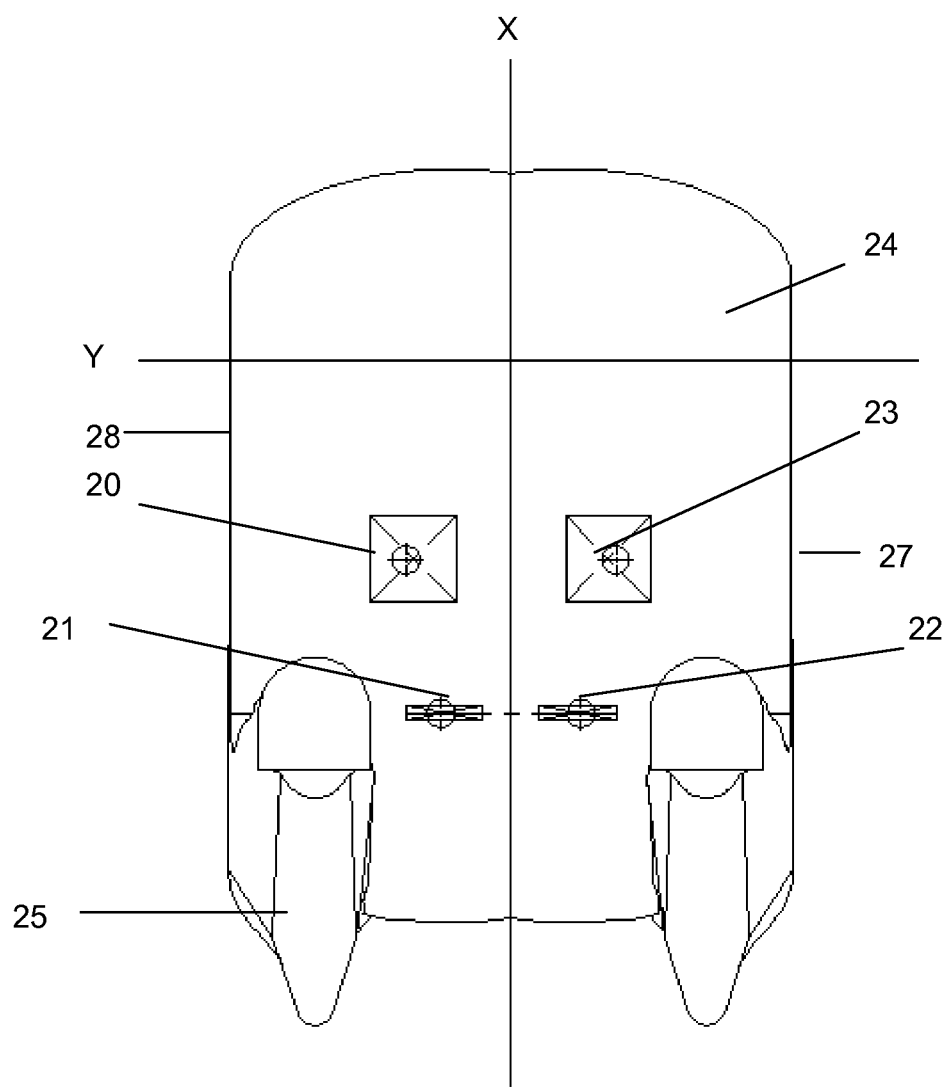
FIG. 2 is a schematic diagram illustrating a top view of the teat locations on a cow.

FIG. 2 illustrates a top view of the teat locations of a cow 24. The teat location may have a large range of possibilities. For example, the teats 20, 21, 22, 23 may be as close as about 4 inches (about 10.6 cm) and as far apart as about 7 inches (about 17.8 cm). Teat location may vary from animal to animal within an animal species and from animal species to animal species. For rear manipulation, the legs of the animal must be spaced apart to allow for the device of the present invention to position itself in the milking position (as further explained below). For example, the hind legs 25 may be about 11 inches (about 27.9 cm) apart. Again, it should be understood that the distances are relative and may be quite variable from animal to animal. FIG. 2 illustrates axes X and Y corresponding to a milking parlour having a lateral arrangement: X substantially along the spine of the animal 24, and axis Y substantially across the spine of animal 24 from one side 27 of animal 24 to the other side 28 of animal 24.

Figure 3:
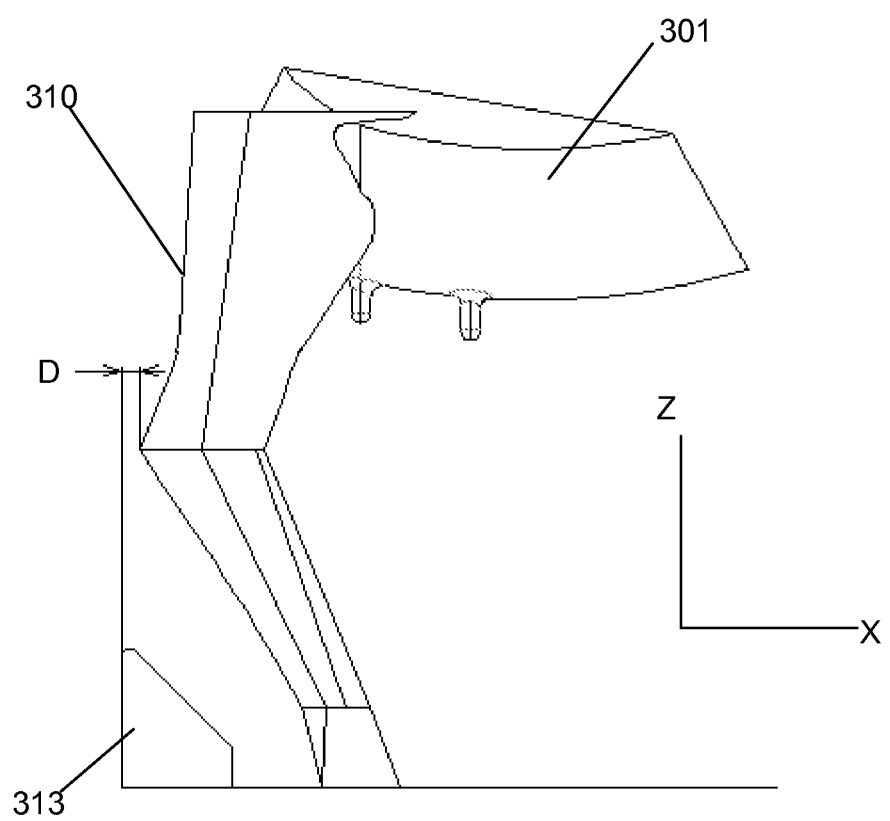
FIG. 3 is a schematic diagram illustrating side a view of a cow in position for manipulation in a milking parlour (parallel arrangement).

FIG. 3 illustrates a side view of an animal (a cow) 301 in relative position for milking. The rear legs 310 of the cow 301 may be positioned within a distance D forward from the face of curb 313. D may be, for example, about 1 inch (about 2.5 cm). It should be understood that distance D is relative and may be quite variable from parlour to parlour. FIG. 3 illustrates axes X and Z corresponding to a milking parlour having a lateral arrangement: X substantially along the spine of the animal 301, and vertical axis Z from the floor to the belly of the animal.

Figure 4:
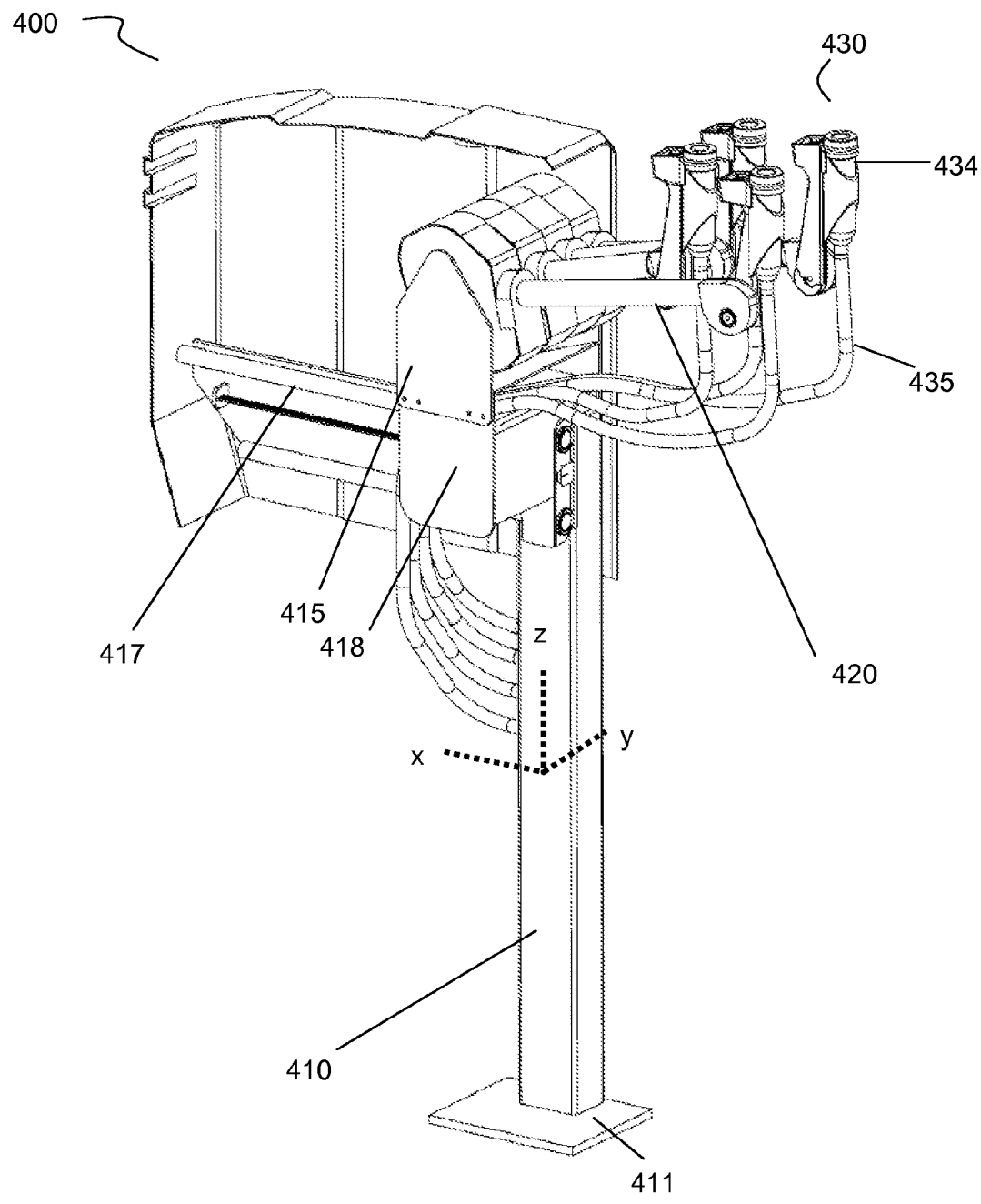
FIG. 4 illustrates a perspective view of a modular apparatus in accordance with one embodiment of the present invention.

FIG. 4 illustrates a perspective view of a modular apparatus 400 according to one embodiment of the present invention. The modular apparatus 400 may include a main support 410, a number of independent arms 420 (four arms are shown in FIG. 4) and one or more changeable tools 430 which may be adapted to manipulate the animal or to generate signals related to the position of the animals teats. The one or more changeable tools 430 may be pivotally coupled to each of the arms 420. It is understood that the number of arms 420 and manipulating/sensing changeable tools 430 may vary depending on the proposed use of the device of the present invention or depending on the animal being manipulated. In one embodiment, the arms 420 may be detachably coupled to the main support 410 and the changeable tools 430 may be detachably coupled to the arms 420.

With reference to FIGS. 1 and 4 the main support 410 may be secured to a stationary object 411. In one aspect the stationary object 411 may be the floor of pit 11. The height of the main support 410 (main z axis of main support 410) may be based upon the relative distance H between the floor 16 of the pit 11 and the platform 12 (or top of the curb 13 if one is provided).

With reference to FIG. 4, each arm 420 may be pivotally mounted to the main support 410 through mounting means 415. Mounting means 415 may be in the form of a carriage which may include a central shaft or axle which may be fixed at its two opposite ends to two end plates 416. The axle may be positioned along the main y axis of the main support 410. The arms 420 may be pivotally mounted to the carriage 415 via the axle. The axle may run through pivot holes of the arms 420 (see pivot hole 515 in FIG. 5). The arms 420 may capable of rotating around the axle. Axle may be represented by pivot axis 516 in FIG. 5. Bearing or bushing means may be included inside the pivot holes which may allow the arms to pivot around the axle.

Carriage 415 may move the coupled arms 420 collectively as a group in a linear fashion, relative to the main support 410 along the x axis of the main support 410. Driving means 418 may be included within carriage 415 for movement of carriage 415 and the coupled arms 420 collectively as a group. Many options exist for driving means 418. In one aspect of the present invention driving means 418 may be an electric motor driving the carriage 415 along rails 417 using, for example, a toothed (timing style) belt.

Figure 5:
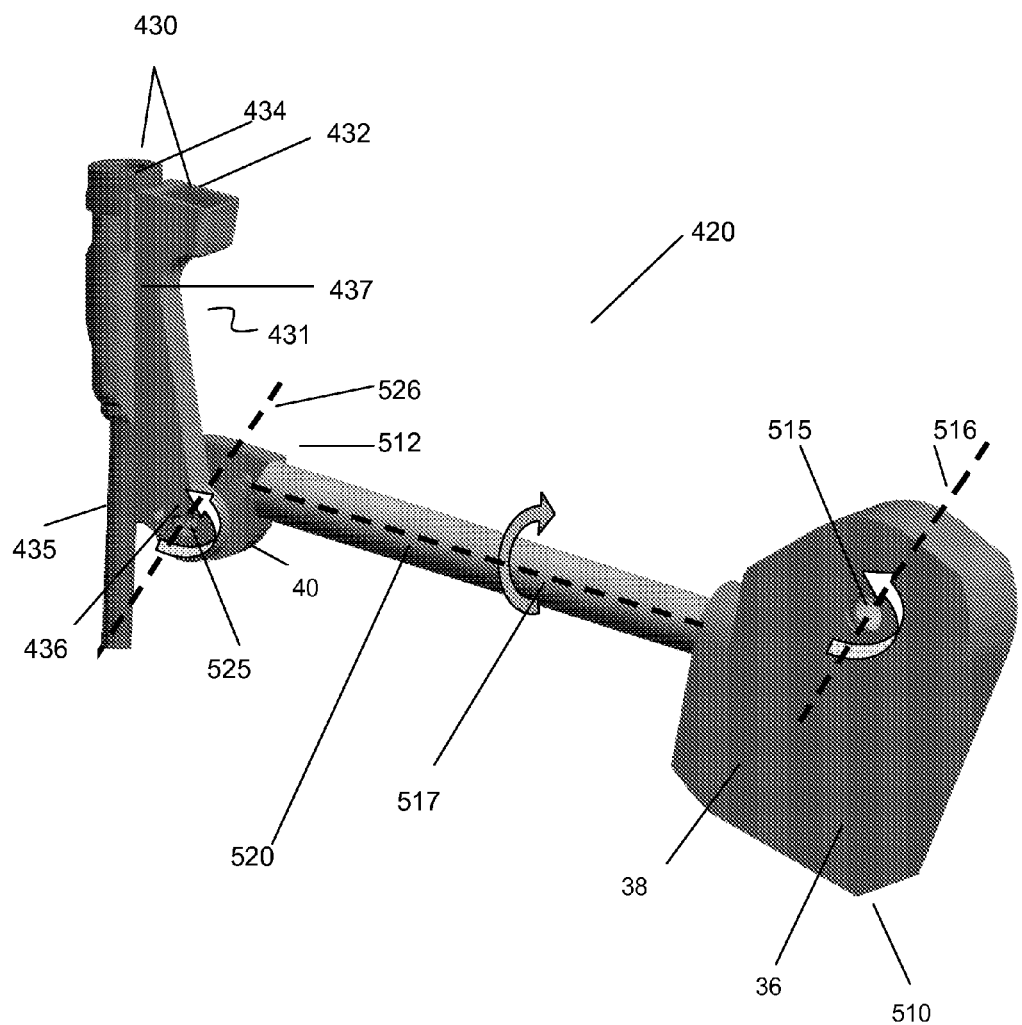
FIG. 5 illustrates perspective view a changeable arm of the modular apparatus in accordance with one embodiment of the present invention.

Arms 420 may be of similar design. In aspects of the invention, the arms 420 may be of substantially identical design. FIG. 5 illustrates a perspective view of one arm 420. The arm 420 may include a main shaft 520 having a proximal end or base 510 and a distal end 512. The proximal end 510 may be detachably and pivotally coupled to the axle in carriage 415 through pivot hole 515 for rotation of the changeable arm 420 relative thereto about a first pivot axis 516, which may correspond to the axle of the carriage 415 illustrated in FIG. 4. One or more changeable tools 430 may be detachably and pivotally coupled to the distal end 512 of main shaft 520 at pivot point 525 for rotation of the one or more changeable tools 430 relative thereto about a second pivot axis 526.

The main shaft 520 may rotate about the first pivot axis 516 thereby providing for rotation of the main shaft 520 in substantially the X-Z plane or movement of the changeable tools in the main Z axis or vertical direction thereby raising or lowering the changeable tools relative to the platform of the stall. In one aspect of the present invention, the arms 420 of the present invention may be capable of rotating about their corresponding first pivots independently from one another or together as a group.

The changeable tools 430 for manipulating or sensing the teats of the animal may rotate about the second pivot axis 526 in substantially the X-Z plane, which may be used to provide a lower profile to the changeable tools for positioning the arm 420 under the animal, or to seek for the animal's teats. The changeable tools of each arm of the present invention may be capable of rotating about their corresponding second pivots independently from one another or together as a group.

The main shaft 520 may also be provided with the ability to rotate about its own main axis 517 which connects the proximal end 510 with the distal end 512. The ability of the main shaft 520 to rotate about axis 517 may provide substantially lateral motion (Y direction) to the changeable tools 430 coupled to the arms. In one aspect of the present invention, the arms of the present invention may be capable of rotating about their corresponding main axes independently from one another or together as a group.

The main shaft 520 may also have the ability to telescope along its own axis 517 thereby allowing for an increased longitudinal vertical range of motion in the X/Z plane between modular units. In one aspect of the present invention, the arms of the present invention may be capable of telescoping movement independently from one another or together as a group.

Movement of the carriage 415 and the telescoping capability of the arms 420 may provide further reach to the one or more changeable tools in the X and Z axes.

Taken together, rotation about pivot axes 516, 517, 526, movement of carriage 415 and the telescoping capability of the arms 420 may provide the one or more changeable tools with multiple degrees of freedom of movement for positioning the one or more changeable tools 430 in a position under the animal and relative to the animal's teats, for searching the animal's teats and for milking the animal.

Each arm 420 may also include a first rotary motor 36, a second rotary motor 38 within the base 510, and a third rotary motor 40 within the distal end 512 to provide pivotal movement of the changeable arm 420 or changeable tools 430 that are attached to a corresponding changeable arm 420. All three motors of each arm, in one aspect, may be incorporated in the proximal end (not shown). In some aspects, hydraulics, instead of belt-motors, may be used.

The one or more changeable tools may be included as an end of arm tooling (EOAT) 431. EOAT 431 may include a base 436 having mounting means configured to be coupled to the distal end 512 of a changeable arm 420. EOAT 431 may also include a housing structure 437 configured for receiving the one or more changeable tools 430.

Different types of changeable tools 430 may be used depending on the task being performed. In one embodiment for the manipulation of animals, the EOAT 431 may include a detection device 432 for generating signals which may be used for determining the location or position of an animal's teat, and a teat cup 434 for attachment to the animal's teat and for milking the animal. The EOAT 431 may also include a fluid-applying device for applying a fluid to the animal's teats. It is understood that the number of arms 420 attached to the main support 410 and the number or type of manipulating/sensing changeable tools 430 may vary depending on the proposed use of the device of the present invention or depending on the animal being manipulated. For example, if the modular apparatus 400 is being used to milk a cow, then up to four arms 420 having coupled teat cups 434 may be needed, while two arms 420 and coupled teat cups 434 may be used for milking a goat.

Milking means such as teat cups are known in the art. Each teat cup 434 may be connected to a milk line 435, which in turn may be connected to a vacuum. The vacuum milk line may receive milk discharged from a corresponding teat cup for further processing.

Detection devices which provide feedback signals that correspond to the relative position of the teats relative to the changeable tools may be included in the EOATs 431. Any suitable kind of detection device capable of determining or sensing teat position or location may be used in the present invention including laser-, camera-, ultrasonic-, and visible light-based detection devices. As provided above, detection devices 432 may be included in the EOATs 431. In aspects of the invention, the detection device may be located on a fixed place inside the milking parlour 10.

With the detection device, therefore, the modular apparatus of the present invention can identify the relative locations of the teats. In this respect, the modular apparatus does not require the animals to be manipulated to have prior information regarding relative locations of the teats, which is a unique advantage over the conventional techniques. In the conventional technology, in some instances, an animal that is to be manipulated is required to have an identification number to which coordinates of the teats are associated and recorded in the system. Therefore, when the animal is being manipulated, the system checks the identification number and uses it to retrieve the coordinates, which are then used to direct the system to the teats for manipulation. In contrast, the modular apparatus of the present invention detects the locations of the teats on the fly, without the need of any prior information concerning the locations of the teats.

Accordingly, it is specifically contemplated that the modular apparatus of the present invention does not have any identification means for reading an identification number or other computer-readable texts or labels on an animal. Examples of identification means include barcode scanner, camera or video camera.

An example of a detection device which may be used with the modular apparatus of the present invention is described in International Appl. No. PCT/US11/36524 (PCT '524), which is incorporated herein by reference in its entirety.

Figure 6:
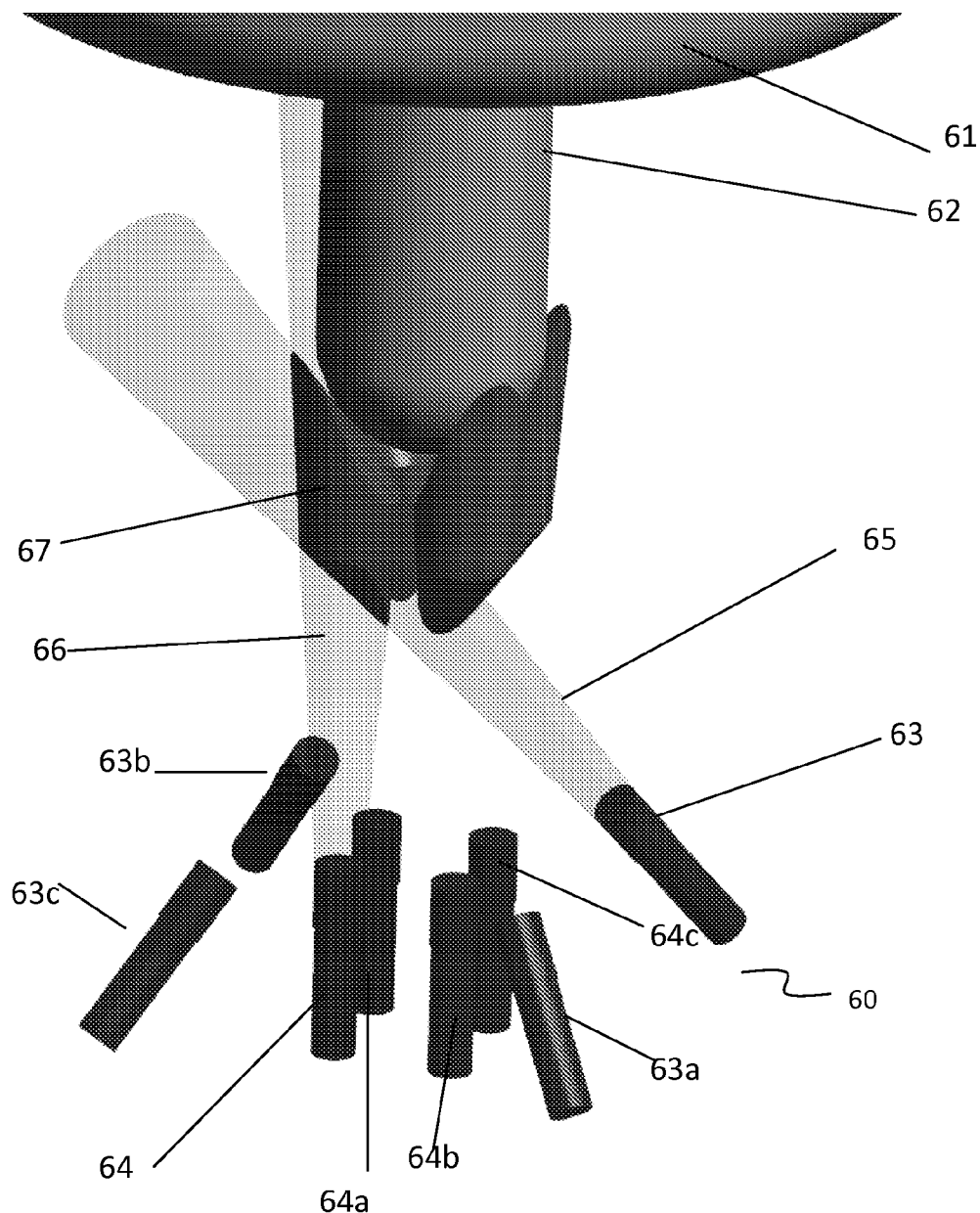
FIG. 6 illustrates a configuration of an array of sensors in accordance to one embodiment of the present invention.

FIG. 6 illustrates a detection device for locating animal teats in accordance with one embodiment of the present invention. The detection device may comprise an array 60 of sensors, each sensor in the array 60 may include a transmitter means 64 which may be capable of transmitting a transmission beam 66, and a receiver means 63 which may be capable of establishing a field of detection or detection field 65. The transmitter means 64 and the receiver means 63 may be disposed such that the substantially transmitted beam 66 and the field of detection 65 may establish a detection zone or sensing volume 67, which may be located at the intersection between the transmission beam 66 and the field of detection 65. FIG. 6 illustrates four sensors: transmitter/receiver pairs 64/63, 64a/63a, 64b/63b and 64c/63c. Although the following example is based on sensor 64/63, it is to be understood that a similar description applies to the other sensors.

The receiver means 63 may only generate a signal in response to an object, such as a teat 62 extending from udder 61, within the detection zone 67. The detection zone 67 may be defined as the place or zone where the receiver means 63 may be able to receive and detect a reflection of the transmission beam 66 from teat 62. The substantially emitted beam 66, such as visible light, from the transmitter means 64 may hit or strike a teat 62 to be detected in a diffuse way and generate a reflective beam. If the teat 62 is within the detection zone 67, then part of the reflected beam from the teat 62 may be detected by the receiver means 63 thereby starting the switching signal operation. If the teat 62 is not within the detection zone 67, then the reflection beam may not be detected by the receiver means 63. The two states—i.e. reflection received or no reflection—may be used to determine the presence or absence of a teat in the sensing range. The receiver means 63 may then output a discrete on/off signal to indicate presence or absence of the received reflection beam. In one embodiment of the present invention the signal may typically be an about 0 volt ("off") or an about 5 volt ("on") digital signal. A skilled reader would understand that the exact nature of this signal is not significant to the invention, as it simply represents a communication signal for logical decision making The teat 62 may be identified as having a particular location when all, or substantially all, of the receiver means 63, 63a, 63b and 63c in the array 60 generate a signal simultaneously in response to the teat 62 within their respective detection zones.

The transmitter means may be a fibre optic transmitter, whereby the actual transmission of the beam may be from a remote location, where the light source for the beam may be located. The receiver means may also be a fibre optic receiver means that may send the reflection signal across fibre optics to a receiver in a remote location. A variety of beam sources may be utilized in the present invention, for example, such as visible light, infrared, laser, or ultrasound. A variety of receiver means may be used, including a light receiving photoelectric device.

The modular apparatus 400 of the present invention may be used to provide for automatic or semi-automatic attachment of the teat cups to the teats of an animal (typically a cow). The modular apparatus of the present invention may be used for manipulating the teats of an animal including, without limitations, milking and spraying with fluids the teats of an animal.

The elements of the modular apparatus of the present invention, including the driving means, the arms, and the one or more changeable tools, may be linked to and controlled by a control unit (not shown) such as a computer. The computer may have input means such as a keyboard to name one, a calculating device and a memory. In one embodiment, the computer may control movement of the arms having detection devices in a search pattern to locate the teats of the animal to be manipulated. The signals generated by the detection device regarding the location of the animal teats may then be used by the control unit for moving the arms in such a way that the teat cups 434 may be attached to the teats of the animal. The control unit may then control a vacuum connected to the teat cups to initialize the milking of the animal and to stop the milking process.

Operation of the Device

The modular apparatus of the present invention may be used in a milking parlour for dairy animals, such as cows, goat and buffalo. The following is an example for milking a cow 15 in a milking parlour of FIG. 1. In this example, with reference to FIGS. 1, 4, 5 and 6, the modular apparatus 400 includes four arms 420, with each changeable arm being coupled to an EOAT 431. Each EOAT may include at least one detection device 432 and one teat cup 434 attached to a milking line 435.

The main support 410 of apparatus 400 may be fixed to the ground floor of the pit 11 of parlour 10. Animals 15 may be loaded into the milking platform 12 illustrated in FIG. 1. This may typically be done in groups from about 6 to about 80 cows at a time. Once the cows are positioned on platform 12 next to a pit 11, the milking process may begin. The milking process according to one embodiment of the present invention may start with some form of an input or go signal to know when the animals are positioned for milking. This may be provided by an operator activating a start button or may be attained automatically by a signal generated by an animal crossing a gate. Once the start signal may be received, the modular apparatus 400 with its arms 420 of the present invention may begin the milking process. The milking process may be divided into the following steps: (1) moving the arms 420 of the apparatus 400 of the present invention to the milking position, (2) locating the animal teats, and (3) attaching the teat cups 434 to the animal teats. A method for moving the arms under a cow 15 will be described below.

(1) Moving the Arms 420 of the Apparatus 400 to the Milking Position.
1. The process may start with all arms 420 in a retracted or home position.
2. After a start or go signal each changeable arm 420 may be made to rotate about first pivot axis 516 substantially in the XZ plane to a low position relative to the animal's udder (reference number 61 of FIG. 6) to allow the EOAT 431 with teat cups 434 to go substantially under the cow's belly.
3. Each EOAT 431 may be made to pivot about second pivot axis 526 substantially in the XZ plane so that each EOAT 431 may be pivoted forward (X direction) to provide a lower profile for entry under the cow 15.
4. Each EOAT 431 may then be moved laterally, substantially on the Y direction, by having the main shaft 520 rotate about its own main axis 517 such that the arms may be in a substantially tight group to go between the rear legs of the cow 15.
5. Driving means 418 of the main support 410 may then move forward (away from the main support 410) the four arms 420 as a group in a substantially longitudinal (X) direction and substantially under and proximate to the udder 61 region of cow 15. In this document, this position substantially under the cow and proximate relative to the udder will be referred to as the milking position.

(2) Locating the Animal Teats

Once the EOATs 431 are in the milking position, each of the arms 420 may independently or as a group, begin the locating and attachment processes and attach the teat cups 434 to the teats 62 of the cow 15.

At this point, the location of the animal teats may be unknown. Accordingly the next step may be to locate the teats of the animal. In this example, each EOAT includes a detection device of PCT '524 illustrated in FIG. 6.

A method of determining the position of a teat 62 using the detection device of FIG. 6 may include at least the following steps: (a) moving the detection device to the milking position; (b) transmitting the transmission beams 66 to the teat 62; and (c) moving the detection device from the milking position in a search pattern until all or substantially all the receivers 63, 63a, 63b and 63c in the array 60 generate a signal in response to the teat 62 within their respective detection zones, thereby determining the position of the teat.

To search for a teat, detection devices 432 included in the EOATs 431 may be moved by rotating the changeable arm 420 and EOAT 431 about pivot axes 516, 517, and 526 to scan for the position of a teat.

(3) Attaching the Teat Cups 434 to the Animal Teats

Once a detection device 532 of one arm 420 locates a teat, that arm 420 may move the teat cup 434 to engage the teat for milking the animal 15 based on the information provided by the detection device 532.

A method for attaching the teat cups 434 included in the EOAT 431 to the teats of the animal will be described below:
(i) moving teat cup(s) in a direction towards the located teat(s), (ii) attaching the teat cup(s) to the located teat(s) and (iii) substantially engage in milking the located teat(s). The teat cup(s) may be connected to a milk line, which may include a vacuum. The vacuum milk line receives milk discharged from a relevant teat cup(s) for further processing.

Once the milking process is finalized, the teat cup(s) may be detached from the teat(s) and the changeable arm(s) may be retracted back to the retracted or home position.

In one aspect of the invention, the position of a teat may be done with a remote detection device and the arms may move directly to the attachment position instead of in a scanning pattern.

Advantages of the modular apparatus of the present invention include:
(a) the apparatus is modular, i.e. it comprises of functional units, modules or sections or arms, which allows for easy construction, flexibility in design, flexible arrangement, reduction in cost.
(b) modularity of the device allows for servicing a single changeable arm off-line and then reused it as a spare part at a later time, modularity also allows ease of service, including reduced spare parts/assembly inventory;
(c) modularity of device allows for manipulating animals having different number of teats;
(d) modularity of device allows for manipulating animals having different teat distribution;
(e) arms of the device are provided with at least three axis of motion, which allow for better manoeuvring of the device under the animal and folding of the device for storage and transportation;

(f) the rotating joints of the arms of the device have the benefit of: (i) precise and robust movement may be achieved more economically compared to sliding or rolling (US '928, for example, provides sliding motions with linear cylinders.), and (ii) inherently easier to seal than translating joints due to lack of "cleaning" requirement (the surface on which sliding seals slide over must be repeatedly "clean");

(g) modularity of the device allows for greater versatility as different changeable tools may be "snap in" to each changeable arm to perform specialized tasks.

The above disclosure generally describes the present invention. Changes in form and substitution of equivalents are contemplated as circumstances may suggest or render expedient. Although specific terms have been employed herein, such terms are intended in a descriptive sense and not for purposes of limitation. Other variations and modifications of the invention are possible. As such modifications or variations are believed to be within the sphere and scope of the invention as defined by the claims appended hereto

The invention claimed is:

1. A modular apparatus used to manipulate teats of an animal, comprising: a main support fixed to a stationary point; a number of arms each having a first end detachably coupled to a carriage mounted on the main support for rotational movement of the arms as a group or independently about a first horizontal axis and said carriage being configured for moving the number of arms as a group in an X direction so as to extend a reach of one or more changeable tools as a group in the X direction; and the one or more changeable tools detachably coupled to a second end of each of the number of arms for rotational movement of the one or more changeable tools as a group or independently about a second axis, said second axis being orthogonal to a third axis extending from the first end to the second end of each changeable arm, wherein rotational movement of the number of arms about the first horizontal axis and rotational movement of the one or more changeable tools about the second axis provide movement to the one or more changeable tools as a group or independently in the X direction and a Z direction to manipulate the teats, the X direction being defined as an horizontal direction that runs along a spine of the animal, and the Z direction being defined as a vertical direction.

2. The modular apparatus of claim 1 characterized in that each of said number of arms is configured to rotate about the third axis extending from the first end to the second end so as to provide rotational movement to the one or more changeable tools as a group or independently in a Y and the Z directions, the Y direction being defined as an horizontal direction that is substantially orthogonal to the spine of the animal.

3. The modular apparatus of claim 1 or 2 characterized in that each of said number of arms is configured to telescope along the third axis extending from the first end to the second end of each arm so as to extend a reach of the one or more changeable tools as a group or independently in the X and the Z directions.

4. The modular apparatus of claim 1 characterized in that said modular apparatus further comprises a controller, said controller being in communication with the one or more changeable tools, the main support and the number of arms, said controller for controlling the movement of the number of arms, the movement of the one or more changeable tools and the changeable tools to manipulate the teats of the animal with the one or more changeable tools.

5. The modular apparatus of claim 1 characterized in that said modular apparatus further comprises a controller having input means, for computing an output to control movement of said number of arms relative to the animal, for computing an output to control movement of said one or more changeable tools, and for computing an output to control operation of said one or more changeable tools to perform the manipulation of the teats.

6. The modular apparatus of claim 1 characterized in that said one or more changeable tools are selected from teat cups adapted for milking the teats, detection devices for generating signals useful for determining a position of the teats, fluid applying device, or any combination thereof.

7. The modular apparatus of claim 1 characterized in that said one or more changeable tools include a teat cup connected to a milking line and a detection device, the device being capable of generating signals useful for determining the position of one teat of the animal, wherein each of said number of arms is capable of attaching the teat cup independently to one teat based on the signals generated by the detection device.

8. The modular apparatus of claim 7 characterized in that the detection device comprises an array of sensors, each sensor in the array including a transmitter means capable of substantially transmitting a transmission beam, and a receiver means capable of establishing a field of detection, said transmitter means and said receiver means being arranged within the array such that a detection zone is generated at the intersection between the transmission beam and the field of detection, said receiver means being capable of receiving a reflected beam from the teat from said transmission beam and reflected by the teat within the detection zone, and said receiver means being capable of generating a signal in response to the reflected beam from the teat within the detection zone, wherein the position of the teat is determined when all or substantially all of the receivers in the array generate the signal substantially simultaneously in response to the teat within their respective detection zones.

9. The modular apparatus of claim 8 wherein said transmission beam is a visible light, infrared or laser beam.

10. The modular apparatus of claim 8 characterized in that the receiving means is a light receiving photoelectric device.

11. The modular apparatus of claim 1 characterized in that said number of arms are capable of moving the one or more changeable tools independently to a position under an udder of the animal relative to the number of teats of the animal.

12. The modular apparatus of claim 11 characterized in that said transmission beam is an ultrasound beam and said receiving means is an ultrasound receiving device.

13. The modular apparatus of claim 1 characterized in that the number of arms pivotally mounted to the main support is between one and the number of teats of the animal.

14. The modular apparatus of claim 1 characterized in that the modular apparatus is installed in a milking parlour, and wherein the animal is selected from a cow, goat and buffalo.

15. A method of milking an animal, said animal having a number of teats, characterized in that said method comprises: (a) pivotally mounting a number of arms to a main support for rotational movement thereof about a first pivot axis, wherein each arm is capable of independent rotational movement about the first pivot axis and said number of arms is between one and the number of teats, (b) pivotally coupling teat cups to the number of arms for rotational movement thereof about a second pivot axis, (c) independently moving each one of the number of arms to place the teat cups in a position suitable to manipulate the number of teats of the animal; and (d) independently attaching each of the teat cups to the teats to milk the animal.

16. A modular apparatus used to manipulate teats of an animal, comprising: a main support fixed to a stationary point; a number of arms each having a first end detachably coupled to the main support for rotational movement of the arms as a group or independently about a first horizontal axis; and one or more changeable tools detachably coupled to a second end of each of the number of arms for rotational movement of the one or more changeable tools as a group or independently about a second axis, said second axis being orthogonal to a third axis extending from the first end to the second end of each changeable arm, wherein rotational movement of the number of arms about the first horizontal axis and rotational movement of the one or more changeable tools about the second axis provide movement to the one or more changeable tools as a group or independently in an X direction and a Z direction to manipulate the teats, the X direction being defined as an horizontal axis that runs along a spine of the animal, and the Z direction being defined as a vertical axis, and wherein the one or more changeable tools include a teat cup connected to a milking line and a detection device, the device being capable of generating signals useful for determining the position of one teat of the animal, wherein each of said number of arms is capable of attaching the teat cup independently to one teat based on the signals generated by the detection device.

17. The modular apparatus of claim 16 characterized in that said number of arms are detachably coupled to a carriage mounted on the main support, said carriage being configured for moving the number of arms as a group in the X direction so as to extend a reach of the one or more changeable tools as a group in the X direction.

18. The modular apparatus of claim 16 characterized in that said modular apparatus further comprises a controller, said controller being in communication with the one or more changeable tools, the main support and the number of arms, said controller for controlling the movement of the number of arms, the movement of the one or more changeable tools and the changeable tools to manipulate the teats of the animal with the one or more changeable tools.

19. The modular apparatus of claim 16 characterized in that the number of arms pivotally mounted to the main support is between one and the number of teats of the animal.

20. The modular apparatus of claim 16 characterized in that the modular apparatus is installed in a parallel milking parlour, and wherein the animal is selected from a cow, goat and buffalo.

* * * * *